US012636636B2

(12) United States Patent (10) Patent No.: US 12,636,636 B2
Liu et al. (45) Date of Patent: May 26, 2026

(54) MONOLITHIC ADSORBENT SHAPING METHOD AND APPLICATION

(71) Applicant: Northeastern University, Shenyang (CN)

(72) Inventors: Liying Liu, Shenyang (CN); Zhe Wang, Shenyang (CN); Zhuo Li, Shenyang (CN)

(73) Assignee: Northeastern University, Shenyang (CN)

( * ) Notice: Subject to any disclaimer, the term of this patent is extended or adjusted under 35 U.S.C. 154(b) by 868 days.

(21) Appl. No.: 17/955,550

(22) Filed: Sep. 29, 2022

(65) Prior Publication Data

US 2023/0096977 A1 Mar. 30, 2023

(30) Foreign Application Priority Data

Sep. 29, 2021 (CN) .......................... 202111152287.6
Oct. 19, 2021 (CN) .......................... 202111217845.2

(51) Int. Cl.
| | |
|---|---|
| *B01J 20/26* | (2006.01) |
| *B01J 20/18* | (2006.01) |
| *B01J 20/22* | (2006.01) |
| *B01J 20/28* | (2006.01) |
| *B01J 20/30* | (2006.01) |

(52) U.S. Cl.
CPC ........... *B01J 20/261* (2013.01); *B01J 20/183* (2013.01); *B01J 20/226* (2013.01); *B01J 20/28042* (2013.01); *B01J 20/3007* (2013.01); *B01J 20/3028* (2013.01); *B01J 20/3042* (2013.01); *B01J 20/3085* (2013.01)

(58) Field of Classification Search
CPC ...... B01J 20/261; B01J 20/183; B01J 20/226; B01J 20/28042; B01J 20/3007; B01J 20/3028; B01J 20/3042; B01J 20/3085
See application file for complete search history.

(56) References Cited

PUBLICATIONS

Hamidouche et al., Material Plastice, (2016), 53(4), 743-748.*
Leonavicius et al., Langmuir, (2011), v.27, 10970-01976.*
Zayan et al., Polymers, (2020), v.12, p. 1764(1-14).*
Rajeswari et al., Environmental Progress & Sustainable Energy, (2016), 35(5), 1293-1298.*
Meng et al., Synthetic Metals, (2010), v.160, p. 116-122.*
Huijs et al., J. of Applied Polymer Science, (2001), v.79, p. 900-909.*
Huijs et al., Journal of Applied Polymer Science, (2001), v.79, p. 900-909. (Provided before).*

* cited by examiner

*Primary Examiner* — Yong L Chu
(74) *Attorney, Agent, or Firm* — Bayramoglu Law Offices

(57) ABSTRACT

A preparation method of a granular adsorbent is provided, including the following: adding a pyrrole monomer to an acidic solution, and adding an oxidant as an initiator to allow a polymerization reaction of the pyrrole monomer to produce polypyrrole (PPy), where an adsorption material powder is added to a reaction system before, during, or immediately after the polymerization reaction, and a resulting mixture is thoroughly stirred; after the polymerization reaction is completed, filtering a resulting reaction system to obtain a filter cake, which is the granular adsorbent; or subjecting the resulting reaction system to centrifugal sedimentation to obtain the monolithic adsorbent. In the present disclosure, the pyrrole monomer is subjected to a polymerization reaction to generate PPy; before being tightly stacked, network structures of PPy wrap the adsorption material powder; and the granular adsorbent is formed through sedimentation and stacking.

6 Claims, 3 Drawing Sheets

MONOLITHIC ADSORBENT SHAPING METHOD AND APPLICATION

CROSS REFERENCE TO THE RELATED APPLICATIONS

This application is based upon and claims priority to Chinese Patent Application No. 202111152287.6, filed on Sep. 29, 2021, and Chinese Patent Application No. 202111217845.2, filed on Oct. 19, 2021, the entire contents of which are incorporated herein by reference.

TECHNICAL FIELD

The present disclosure relates to the technical field of adsorbent preparation, and in particular to a granular adsorbent, and a preparation method and use thereof.

BACKGROUND

Carbon emission is considered as the main cause of global warming, and the continuous rise in concentration of greenhouse gas in the atmosphere has drawn public attention. The carbon capture technology can reduce carbon emissions. The carbon capture technology mainly relies on $CO_2$ adsorption materials. $CO_2$ adsorption materials usually possess a large specific surface area (SSA), suitable pore size and surface structure along with outstanding mechanical properties, exhibiting a strong adsorption capacity for adsorbate. The adsorbent materials are easily produced and regenerated due to their chemical stability without easy chemical reactions with the adsorbates.

Common solid adsorbents include a zeolite molecular sieve (ZMS), a porous metal oxide, a metal-organic framework (MOF), Zeolitic imidazolate framework (ZIF), mesoporous silica (MS), a porous polymer material, a porous carbon material, and the like. ZMS is a microporous crystal material with excellent hydrothermal stability. Due to an adjustable acidity and unique pore structure, ZMS is widely used in the fields such as acid catalysis, selective oxidation, and adsorption and desorption. MOF is a crystalline porous material with a periodic framework that is formed through self-assembly of inorganic metal centers (metal ions or metal clusters) and bridging organic ligands.

Generally, when adsorbent powders are used as adsorption materials, aluminum oxide, clay, and other binding agents need to be added for molding to ensure the mechanical strength of a formed product. However, aluminum oxide and clay themselves do not have catalytic activity and adsorption capacity. Therefore, the addition of such binding agents will reduce the content of effective adsorption components of an adsorbent and reduce the adsorption capacity. At present, the development of MOF powder molding processes mainly includes mechanical molding under pressure and blend molding. Mechanical molding refers to processing MOF powders into monolithic MOFs with a specified shape and density under the action of a mechanical load, with or without the addition of a binding agent. For example, a tablet machine is used to press-mold MOF powders. The mechanical molding method will cause deformation and collapse of a structure of MOF itself. The blend molding refers to mixing and stirring a polymer, a solvent, and a MOF powder and allowing the solvent to evaporate to form a film or granules. However, because most polymers have high viscosity, MOF particles tend to agglomerate, and polymer molecular chains are easy to block the pore structure of MOF, causing a problem such as a decrease in SSA of an adsorbent product. Therefore, the development of a new preparation method of an adsorbent is of great significance for improving the adsorption capacity of the adsorbent.

SUMMARY

I. Technical Problem to be Solved

In view of the above-mentioned shortcomings and deficiencies in the art, the present disclosure provides a preparation method of a granular adsorbent, and use thereof, which solves the problem that the existing adsorbents (molecular sieve, MOF, ZIF, activated carbon, etc.) shaping method has the disadvantages such as low effective adsorption component content, low SSA, and poor performance.

II. Technical Solution

To achieve the above objective, the present disclosure adopts the following technical solution:

In a first aspect, the present disclosure provides a preparation method of a granular adsorbent, including:

The pyrrole monomer is added to an acidic solution and an oxidizing agent is used as an initiator to polymerize the pyrrole monomer to produce polypyrrole (PPy). Adsorbent material powder is introduced to the reaction system prior, during or immediately after the polymerization and the resulting mixture is thoroughly stirred;

After the polymerization reaction is completed, the resulting reaction system is filtered to obtain a filter cake, which is the monolithic adsorbent; or the resulting reaction system is subjected to centrifugal sedimentation to obtain a solid residue, which is the monolithic adsorbent.

According to a preferred embodiment of the present disclosure, the adsorption material powder may be a MOF, ZIF, ZMS, or other powder.

According to a preferred embodiment of the present disclosure, the acidic solution may be a hydrochloric acid solution with a pH of <7.

According to a preferred embodiment of the present disclosure, the oxidant may be a mixture of hydrogen peroxide and a ferric salt. Preferably, the oxidant may be added at an amount as follows: a molar ratio of the hydrogen peroxide to the pyrrole monomer is 4.6:1 and a molar ratio of iron ions in the ferric salt to the pyrrole monomer is 0.03:1. Preferably, the ferric salt may be ferric chloride. The two-component catalyst undergoes the following reactions: $H_2O_2+2Fe^{3+}=2Fe^{2+}+O_2 \uparrow +2H^+$ and $H_2O_2+2Fe^{2+}+2H^+=2Fe^{3+}+2H_2O$. A total reaction formula of the two: $2H_2O_2=O_2\uparrow+2H_2O$. $Fe^{3+}$ serves as an oxidation catalyst to accelerate the reaction.

The Fenton's reagent composed of the hydrogen peroxide and ferric salt has high oxidizability, and the system and product are green and non-toxic. Only a small amount of iron ions is required to achieve high oxidizability. Other common oxidants such as sodium persulfate (SPS) and ammonium persulfate (APS) have toxicity to some degree and are not conducive to long-term use.

According to a preferred embodiment of the present disclosure, the filter cake obtained after the filtration or the solid residue obtained after the centrifugal sedimentation may be washed with deionized water until a resulting washing liquid is clear, and then dried at 80° C. to 90° C. for 12 h to 24 h to obtain the monolithic adsorbent.

According to a preferred embodiment of the present disclosure, the filtering may be conducted using a mold with a filtering function; and after the reaction system is added to the mold, a filtrate is filtered out, and the filter cake is formed in the mold such that the filter cake has a shape matching an inner chamber of the mold. Preferably, the mold may be connected to a vacuum pump for suction filtration.

According to a preferred embodiment of the present disclosure, when the adsorption material powder is a MOF powder, the preparation method may include the following steps:

step 1: adding the pyrrole monomer to the acidic solution, and thoroughly stirring;

step 2: adding the MOF powder to a solution obtained in step 1, and thoroughly stirring;

step 3: adding the oxidant to a solution obtained in step 2, and stirring at room temperature, such that the oxidant initiates the polymerization reaction of the pyrrole monomer to produce PPy;

step 4: filtering a reaction system obtained in step 3 to obtain a filter cake, which is a granular MOF adsorbent; or, subjecting the reaction system to centrifugal sedimentation to obtain a solid residue, which is a monolithic MOF adsorbent.

According to a preferred embodiment of the present disclosure, the stirring in step 3 may be conducted for 3 h to 9 h.

According to a preferred embodiment of the present disclosure, the stirring in step 2 may be conducted for 0.5 h to 1 h and the stirring in step 1 may be conducted for 5 min to 15 min.

According to a preferred embodiment of the present disclosure, when the adsorption material powder is a ZMS powder, the preparation method may include the following steps:

S1: adding the pyrrole monomer to the acidic solution, and thoroughly stirring;

S2: adding the oxidant to a solution obtained in S1, and stirring at room temperature, such that the oxidant initiates the polymerization reaction of the pyrrole monomer to produce PPy;

S3: washing a reaction system obtained in S2 with water until the reaction system is neutral, adding the ZMS powder, and thoroughly stirring at room temperature;

S4: filtering a reaction system obtained in S3 to obtain a filter cake, which is a granular ZMS adsorbent; or, subjecting the reaction system to centrifugal sedimentation to obtain a solid residue, which is a monolithic ZMS adsorbent.

According to a preferred embodiment of the present disclosure, the stirring in S2 may be conducted for 3 h to 9 h.

According to a preferred embodiment of the present disclosure, the stirring in S3 may be conducted for 5 min to 15 min and the stirring in S1 may be conducted for 5 min to 15 min.

In a second aspect, the present disclosure also provides a monolithic adsorbent prepared by the shaping method according to any one of the embodiments described above.

In a third aspect, the present disclosure also provides use of the granular adsorbent; and the granular adsorbent is used as a gas adsorption or catalyst agent.

Preferably, the granular adsorbent may adsorb a gas in a humid environment. For example, the granular adsorbent can be filled in a humid flue gas to directly adsorb $CO_2$ and other gases. However, the existing mass-produced adsorbent cannot directly adsorb $CO_2$, and can only adsorb $CO_2$ from a flue gas pretreated to remove moisture. Therefore, the shaped adsorbent prepared by the present disclosure has obvious advantages.

In addition, with the shaped adsorbent prepared by the present disclosure, $CO_2$, $CH_4$, or $N_2$ can be adsorbed and desorbed under variable temperature and pressure conditions to achieve the adsorptive separation of a gas. For example, the monolithic adsorbent can effectively adsorb a gas under high pressure (low temperature), and release the adsorbed gas under low pressure (high temperature) to achieve the purpose of adsorptive separation.

III. Beneficial Effects

In the preparation method of the monolithic adsorbent provided by the present disclosure, a pyrrole monomer is added to an acidic solution, and conditions suitable for a polymerization reaction of the pyrrole monomer are provided, where a MOF or ZMS powder (or other adsorbent materials) is added to a reaction system before, during, or immediately after the polymerization reaction; and then a resulting liquid-phase reaction system is subjected to filtration (preferably suction filtration) or centrifugal sedimentation to obtain a filter cake or a solid residue, which is the monolithic adsorbent. Both the adsorbent material powder and PPy in the granular adsorbent have an adsorption effect. Compared with the existing preparation method with the addition of a binding agent, the shaped adsorbent prepared by the present disclosure has water resistance and better adsorbability, will not be disintegrated when exposed to moisture, can adsorb $CO_2$ in a humid environment (without the need to pre-remove the moisture in flue gas), and is environment-friendly and energy-saving. The preparation method of the monolithic adsorbent of the present disclosure is simple and rapid, and does not damage the structure of the MOFs or other powders themselves, which is suitable for industrial applications.

DETAILED DESCRIPTION OF THE EMBODIMENTS

Figure 1:
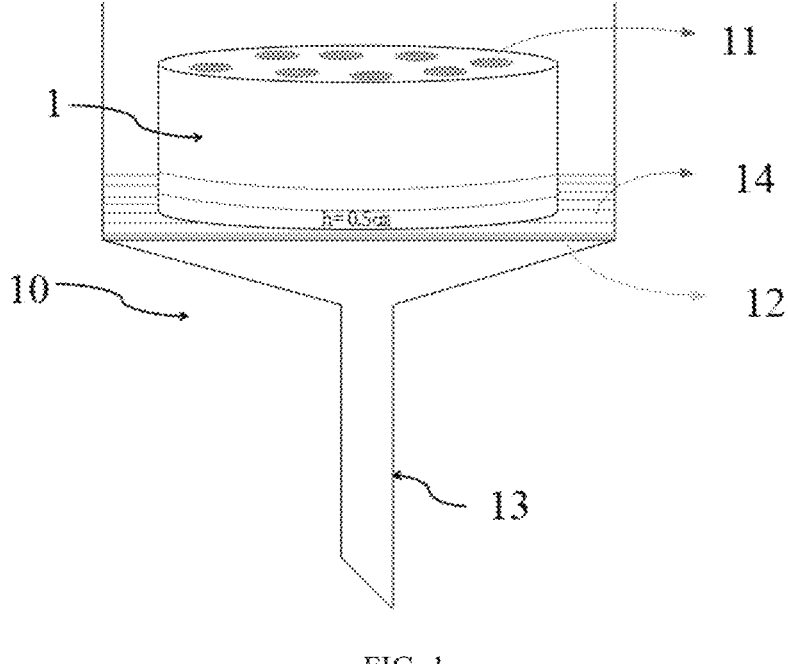
FIG. 1 is a schematic diagram of a mold with a filtering function to prepare the granular adsorbent.

Main idea of the present disclosure: When a powder material is processed into a granular (large-particle), PPy is used to aggregate the powder material. Specifically, before, during, or immediately after the polymerization reaction of the pyrrole monomer to produce PPy, the adsorption material powder is added to a reaction system, and a resulting mixture is thoroughly stirred, such that the generated PPy agglomerates the adsorption material powder by wrapping and winding. It should be noted that, in the present disclosure, the PPy and the adsorption material powder are not simply mixed and stirred, but before the tight stacking of PPy, a loose network structure of PPy wraps and winds the adsorption material powder, and then the adsorption material powder is molded into the granular adsorbent through sedimentation and stacking.

In the prepared granular adsorbent, PPy plays the role of agglomerating an adsorption material powder (MOF, ZIF, molecular sieve powder, etc.) by wrapping and winding, and the adsorption material powder (MOF, molecular sieve powder, etc.) is supported between a PPy molecular chain and a film layer, such that the PPy has large SSA and porosity and the PPy itself has adsorbability to some degree.

Specifically, based on the different characteristics of MOFs and zeolite molecules, the preparation method of a granular adsorbent of the present disclosure can be conducted as follows.

When a granular MOF adsorbent is prepared, the preparation method is as follows: a pyrrole monomer is added to an acidic solution, then a MOF powder is added, and a resulting mixture is thoroughly stirred; then an oxidant (hydrogen peroxide and ferric chloride) is added to a resulting solution, and a resulting mixture is thoroughly stirred until a polymerization reaction is completed to produce PPy; and a resulting reaction system is filtered, washed, and poured into a mold with a filtering function, and a filter cake is washed, and dried to obtain the monolithic MOF adsorbent.

When a granular ZMS adsorbent is prepared, the preparation method is as follows: a pyrrole monomer is added to an acidic solution, then an oxidant (hydrogen peroxide and ferric chloride) is added, and a resulting mixture is thoroughly stirred until a polymerization reaction is completed to produce PPy; a resulting reaction system is washed until neutral, and then a ZMS powder is added; and a resulting mixture is thoroughly stirred and then poured into a mold with a filtering function, and a filter cake is washed and dried to obtain the granular MOF adsorbent. Since the ZMS cannot exist in a strongly acidic environment, in the preparation of the granular ZMS adsorbent, the ZMS is added after the reaction to produce PPy is completed and the PPy is washed to remove the acid.

The method of the present disclosure involves rapid reaction, mild reaction conditions such as temperature and pressure, and no secondary pollution. A filtrate obtained after the filtration is collected to provide an acidic environment and an oxidant for the next preparation. The filtrate can be recycled many times to reduce costs. A final product of the preparation is a solid hard granule and can be directly put into an adsorption column for use.

In order to better explain the present disclosure, the present disclosure is described in detail below with reference to the accompanying drawings and specific examples.

Example 1 (20% PPy)

1 mL of HCl was added to 55 mL of deionized water, and a resulting solution was thoroughly stirred on a magnetic stirrer; then 0.5 mL of a pyrrole monomer was added dropwise to the prepared acidic solution, and a resulting mixture was thoroughly stirred for 10 min; 2.4 g of a UiO-66 powder was added (a weight ratio of PPy to UiO-66:1:4, namely, a UiO-66 weight proportion: 80 wt %), and a resulting mixture was thoroughly stirred for 30 min; an oxidant (2.5 mL of $H_2O_2$ and 0.08 g of $FeCl_3$) was added, and a resulting mixture was thoroughly stirred for 6 h at room temperature until a polymerization reaction was completed; and a resulting reaction system was filtered using a device shown in FIG. 1 (PPy settled and stacked to wrap the UiO-66 powder to form a granule) to obtain a filter cake, and the filter cake was dried in a 90° C. drying oven to remove moisture to obtain a cylindrical UiO-66 granule. A mass of the PPy accounts for 20% of a mass of the cylindrical UiO-66 granule The filter device 10 shown in FIG. 1 includes a mold 1 with a plurality of holes 11. A filter material 12 is provided at a bottom of the mold 1, and the holes 11 penetrate through the bottom of the mold 1. A joint 13 connected to a suction filtration pump is provided under the filter material 12.

In order to prevent a solid in a reaction mixture from flowing out through a bottom of the holes 11, a plastic gasket 14 can be provided. The plastic gasket is provided with a groove of a specific depth (0.5 cm), and the bottom of the mold 1 is embedded in the groove. The filter material 12 is arranged under the plastic gasket 14, and a bottom of each hole 11 is in contact with the filter material 12.

After the reaction mixture is poured into the pores 11 of the mold 1, the suction filtration pump starts to work, a filtrate is drained, and a filter cake is formed in the pores 11. The filter cake is a granular adsorbent, which has a shape matching the hole 11. According to shape and size requirements of the granular adsorbent, holes 11 of different shapes and sizes can be provided, or the formed adsorbent can be cut or broken for use.

Example 2 (15% PPy)

1 mL of HCl was added to 55 mL of deionized water, and a resulting solution was thoroughly stirred on a magnetic stirrer; then 0.5 mL of a pyrrole monomer was added dropwise to the prepared acidic solution, and a resulting mixture was thoroughly stirred for 5 min to 15 min; 3.4 g of a UiO-66 powder was added (UiO-66 was a MOF material), and a resulting mixture was thoroughly stirred for 30 min; an oxidant (2.5 mL of $H_2O_2$ and 0.08 g of $FeCl_3$) was added, and a resulting mixture was thoroughly stirred for 6 h at room temperature until a polymerization reaction was completed; and a resulting reaction system was filtered using a device shown in FIG. 1 (PPy settled and stacked to wrap the UiO-66 powder to form a granule) to obtain a filter cake, and the filter cake was dried in a 90° C. drying oven to remove moisture to obtain a cylindrical UiO-66 granule. A mass of the PPy accounts for 15% of a mass of the cylindrical UiO-66 granule.

Example 3 (10% PPy)

1 mL of HCl was added to 55 mL of deionized water, and a resulting solution was thoroughly stirred on a magnetic stirrer; then 0.5 mL of a pyrrole monomer was added dropwise to the prepared acidic solution, and a resulting mixture was thoroughly stirred for 5 min to 15 min; 5.4 g of a UiO-66 powder was added (a UiO-66 weight proportion: 90 wt %), and a resulting mixture was thoroughly stirred for 30 min; an oxidant (2.5 mL of $H_2O_2$ and 0.08 g of $FeCl_3$) was added, and a resulting mixture was thoroughly stirred for 6 h at room temperature until a polymerization reaction was completed; and a resulting reaction system was filtered using a device shown in FIG. 1 (PPy settled and stacked to wrap the UiO-66 powder to form a granule) to obtain a filter cake, and the filter cake was dried in a 90° C. drying oven to remove moisture to obtain a cylindrical UiO-66 granule. A mass of the PPy accounts for 10% of a mass of the cylindrical UiO-66 granule.

Example 4 (5% PPy)

1 mL of HCl was added to 55 mL of deionized water, and a resulting solution was thoroughly stirred on a magnetic stirrer; then 0.5 mL of a pyrrole monomer was added dropwise to the prepared acidic solution, and a resulting mixture was thoroughly stirred for 5 min to 15 min; 11.4 g of a UiO-66 powder was added (a UiO-66 weight proportion: 95 wt %, which was a MOF material), and a resulting mixture was thoroughly stirred for 30 min; an oxidant (2.5 mL of $H_2O_2$ and 0.08 g of $FeCl_3$) was added, and a resulting mixture was thoroughly stirred for 6 h at room temperature until a polymerization reaction was completed; and a resulting reaction system was filtered using a device shown in FIG. 1 (PPy settled and stacked to wrap the UiO-66 powder to form a granule) to obtain a filter cake, and the filter cake was dried in a 90° C. drying oven to remove moisture to obtain a cylindrical UiO-66 granule. A mass of the PPy accounts for 5% of a mass of the cylindrical UiO-66 granule.

In the cylindrical UiO-66 adsorbents prepared in Examples 1 to 4, a mass percentage of PPy is 20%, 15%, 10%, and 5%, respectively.

Figure 2:
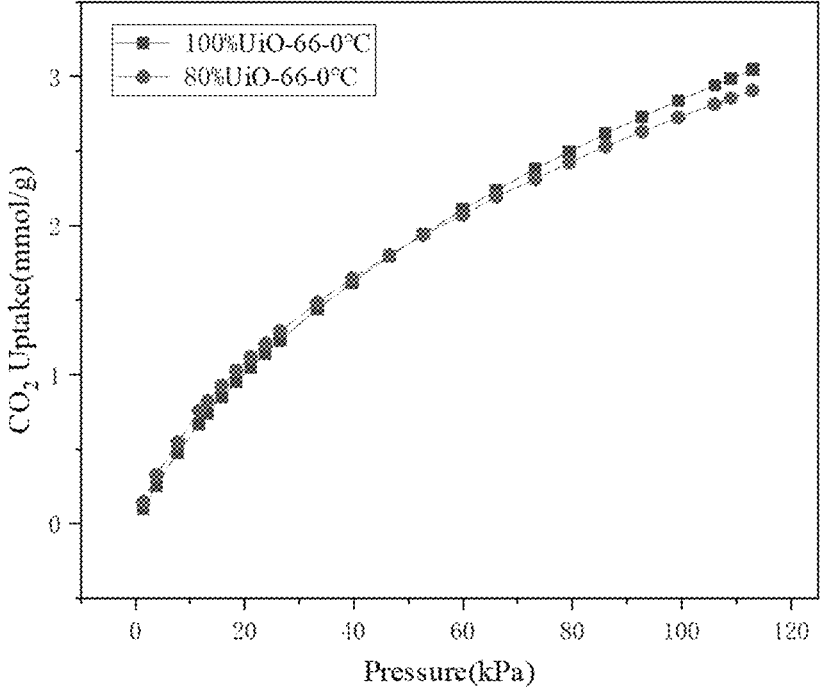
FIG. 2 shows a $CO_2$ adsorption isotherm of the granular MOF adsorbent with 20% PPy at 0° C.
Figure 3:
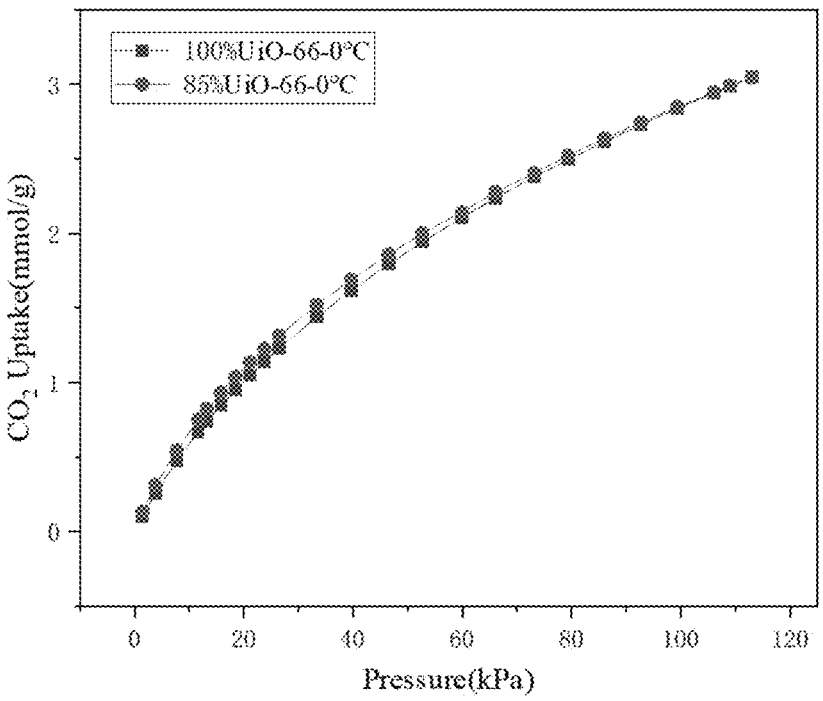
FIG. 3 shows a $CO_2$ adsorption isotherm of the granular MOF adsorbent with 15% PPy at 0° C.
Figure 4:
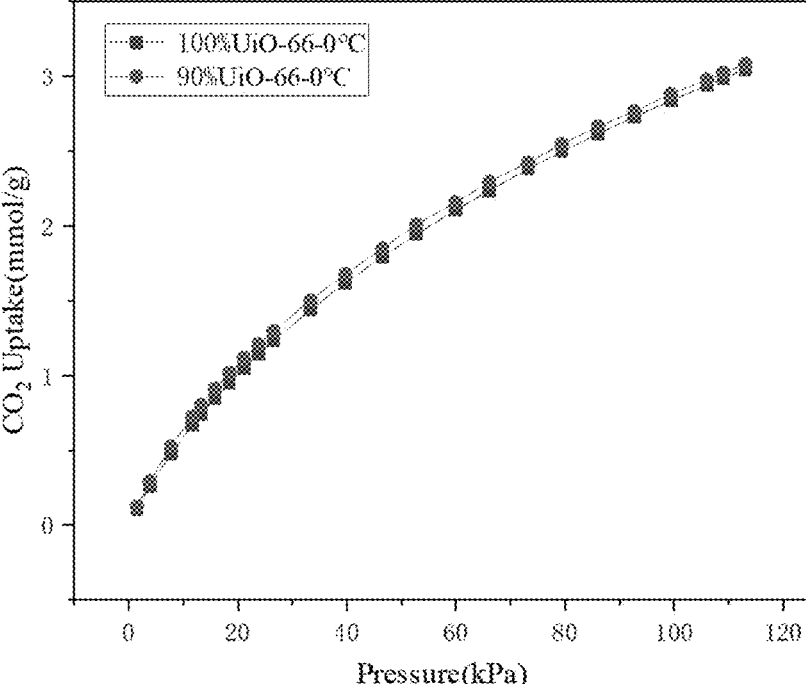
FIG. 4 shows a $CO_2$ adsorption isotherm of the granular MOF adsorbent with 10% PPy at 0° C.
Figure 5:
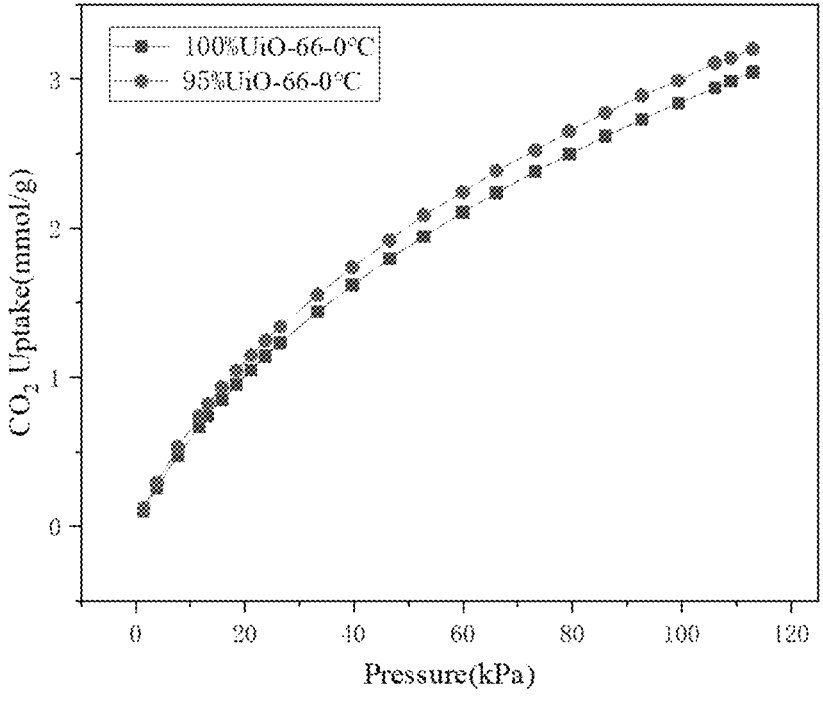
FIG. 5 shows a $CO_2$ adsorption isotherm of the granular MOF adsorbent with 5% PPy at 0° C.

A physical adsorption instrument was used to conduct an adsorption test on the granular MOF adsorbents prepared in Examples 1 to 4 at 0° C. using a single-component $CO_2$ gas, and an adsorption curve was plotted with an absolute pressure as the x-coordinate and an adsorption capacity as the y-coordinate, as shown in FIG. 2 to FIG. 5. Results show that a $CO_2$ amount adsorbed by the sample with a UiO-66 weight proportion of 95 wt % at 0° C. is significantly higher than that adsorbed by the sample with a UiO-66 weight proportion of 100 wt % (as shown in FIG. 5), which increases the adsorption capacity and reduces the cost. As shown in FIG. 3 to FIG. 4, a $CO_2$ amount adsorbed by the sample with a UiO-66 weight proportion of 90 wt % or 85 wt % at 0° C. is basically the same as that adsorbed by the sample with a UiO-66 weight proportion of 100 wt %, which reduces the cost. As shown in FIG. 2, a $CO_2$ amount adsorbed by the sample with a UiO-66 weight proportion of 80 wt % at 0° C. is slightly lower than that adsorbed by the sample with a UiO-66 weight proportion of 100 wt %. Moreover, the present disclosure processes a powdery adsorbent into a bulky adsorbent, which improves the practical occasions of the adsorbent, prevents the powdery adsorbent from being taken away and lost in an airflow environment (flue or air duct) or due to water flushing, saves a lot of cost, and has very high cost performance in practical applications.

Similarly, the method of the present disclosure is also suitable for processing a ZMS powder into a granular adsorbent, as described in the following example.

Example 5

1 mL of HCl was added to 55 mL of deionized water (with a pH of 0), and a resulting mixture was thoroughly stirred on a magnetic stirrer; 0.5 mL of a pyrrole monomer was added, and a resulting mixture was thoroughly stirred for 10 min (to produce 0.6 g of PPy); an oxidant (2.5 mL of $H_2O_2$ and 0.08 g of $FeCl_3$) was added, and a resulting mixture was thoroughly stirred at room temperature for 6 h until a polymerization reaction was completed; the obtained PPy was washed with ultrapure water (UPW) to remove the acidic solution, and then 2.4 g of a NaY molecular sieve powder (a NaY weight proportion: 80 wt %) was added; and a resulting mixture was thoroughly stirred and then filtered using the device shown in FIG. 1 (PPy settled and stacked to wrap the molecular sieve powder to form a granule) to obtain a filter cake, and the filter cake was dried in a 90° C. drying oven to remove moisture to obtain a cylindrical NaY granular adsorbent. In the granular adsorbent, a PPy content is 20%.

Finally, it should be noted that the above examples are merely intended to describe the technical solutions of the present disclosure, rather than to limit the present disclosure. Although the present disclosure is described in detail with reference to the above examples, persons of ordinary skill in the art should understand that modifications may be made to the technical solutions described in the above examples or equivalent replacements may be made to some or all technical features thereof, which do not make the essence of corresponding technical solutions depart from the scope of the technical solutions in the examples of the present disclosure.

What is claimed is:

1. A granular adsorbent prepared by the steps of:
   adding a pyrrole monomer to an acidic solution, and adding an oxidant as an initiator to obtain a first reaction system and allow a polymerization reaction of the pyrrole monomer to produce polypyrrole (PPy), wherein
   the oxidant is a mixture of hydrogen peroxide and a ferric salt, the hydrogen peroxide and the ferric salt are added at an amount such that a molar ratio of the hydrogen peroxide to the pyrrole monomer is 4.6:1, and a molar ratio of iron ions in the ferric salt to the pyrrole monomer is 0.03:1; and wherein
   an adsorption material powder is added to the first reaction system before, during, or immediately after the polymerization reaction, and uniformly stirred to obtain a second reaction system;
   after the polymerization reaction is completed, filtering the second reaction system to obtain a filter cake, and molding the filter cake to obtain the granular adsorbent; or, subjecting the second reaction system to a centrifugal sedimentation and molding to obtain the monolithic adsorbent; and wherein
   the adsorption material powder is a metal-organic framework (MOF) powder, Zeolitic imidazolate framework (ZIF) powder, or zeolite molecular sieve (ZMS) powder, and
   a mass percentage of the PPy in the granular adsorbent is between 5% and 20%.

2. The granular adsorbent according to claim 1, wherein the granular adsorbent is configured to be used as a gas adsorption material.

3. The granular adsorbent according to claim 1, wherein the acidic solution is a concentrated hydrochloric acid solution with a pH<7.

4. The granular adsorbent according to claim 1, wherein the step of filtering is conducted using a mold with a filtering function; and after the second reaction system is added to the mold, a filtrate is filtered out, and the filter cake is formed in the mold such that the filter cake has a shape matching an inner chamber of the mold.

5. The granular adsorbent according to claim 1, wherein when the adsorption material powder is the MOF powder, the preparation method comprises the following steps:
   step 1: adding the pyrrole monomer to the acidic solution, and thoroughly stirring to obtain a first solution;
   step 2: adding the MOF powder to the first solution obtained in step 1, and thoroughly stirring to obtain a second solution;
   step 3: adding the oxidant to the second solution obtained in step 2, and stirring at room temperature to obtain the second reaction system, such that the oxidant initiates the polymerization reaction of the pyrrole monomer to produce the PPy;

step 4: filtering the second reaction system obtained in step 3 to obtain the filter cake, molding the filter cake to obtain a granular MOF adsorbent; or, subjecting the second reaction system to a centrifugal sedimentation to obtain a solid residue, and molding the solid residue to obtain the monolithic MOF adsorbent.

6. The granular adsorbent according to claim 1, wherein when the adsorption material powder is the ZMS powder, the preparation method comprises the following steps:

S1: adding the pyrrole monomer to the acidic solution, and thoroughly stirring to obtain a first solution;

S2: adding the oxidant to the first solution obtained in S1, and stirring at room temperature to obtain the first reaction system, such that the oxidant initiates the polymerization reaction of the pyrrole monomer to produce the PPy;

S3: washing the first reaction system obtained in S2 with water until the first reaction system is neutral, adding the ZMS powder to the first reaction system to obtain the second reaction system, and thoroughly stirring the second reaction system at room temperature;

S4: filtering the second reaction system obtained in S3 to obtain the filter cake, molding the filer cake to obtain a granular ZMS adsorbent; or, subjecting the second reaction system to a centrifugal sedimentation obtain a solid residue, and molding the solid residue to obtain the monolithic ZMS adsorbent.

\* \* \* \* \*